United States Patent [19]

Takaiwa et al.

[11] Patent Number: 5,206,731
[45] Date of Patent: Apr. 27, 1993

[54] SOLID STATE CAMERA HAVING A CAMERA BODY FOR SUPPORTING A RECORDING MEDIUM

[75] Inventors: Kan Takaiwa, Tokyo; Toshihiko Mimura, Kanagawa; Yoshitaka Murata, Kanagawa; Nobuaki Date, Kanagawa; Hideaki Kawamura, Kanagawa; Hiroyuki Horii, Kanagawa; Akihiko Tojo, Kanagawa; Takashi Suzuki, Kanagawa; Seiichi Ozaki, Kanagawa, all of Japan

[73] Assignee: Canon Kabushiki Kaisha, Tokyo, Japan

[21] Appl. No.: 398,137

[22] Filed: Aug. 24, 1989

[30] Foreign Application Priority Data

Sep. 5, 1988 [JP] Japan ............................ 63-220368
Sep. 5, 1988 [JP] Japan ............................ 63-220369
Mar. 28, 1989 [JP] Japan ............................. 1-076022
Mar. 28, 1989 [JP] Japan ............................. 1-076023

[51] Int. Cl.$^5$ ........................................... H04N 5/30
[52] U.S. Cl. ................................... 358/209; 358/335; 358/906; 358/909
[58] Field of Search ............... 358/909, 906, 209, 335, 358/229; 273/148 B; 439/76

[56] References Cited

U.S. PATENT DOCUMENTS 4,489,351 12/1984 D'Alayer de Cobtemore d'Arc ................................... 358/209
4,907,231 3/1990 Watanabe et al. .................. 358/209

*Primary Examiner*—Tommy P. Chin
*Assistant Examiner*—Huy Nguyen
*Attorney, Agent, or Firm*—Robin, Blecker, Daley & Driscoll

[57] ABSTRACT

A solid-state camera employing as a recording medium a solid-state memory cartridge capable of being loaded into and unloaded from the camera body. First signal-transmission sections are provided on the camera body and a solid-state memory cartridge for permitting the transmission of a signal between the camera body and a solid-state memory cartridge loaded therein while assuming a first loading state. At least one second signal-transmission section is provided on the camera body for permitting signal transmission between the camera body and a solid-state memory cartridge loaded therein while assuming a second loading state different from the first loading state.

20 Claims, 12 Drawing Sheets 5,206,731

SOLID STATE CAMERA HAVING A CAMERA BODY FOR SUPPORTING A RECORDING MEDIUM

BACKGROUND OF THE INVENTION

1. Field of the Invention

The present invention relates to a solid-state camera and, more specifically, to an electronic camera employing an unloadable solid-state memory device as a recording medium.

2. Description of the Related Art

Cameras which have hitherto been used to record still pictures include film cameras employing sensitized materials of various silver-halides, and electronic still video cameras employing magnetic disks. Also, in recent years, with the increase in the integration level of semiconductor memories and the reduction in the price thereof, electronic still video cameras of a different type (hereinafter referred to as "solid-state cameras") have been proposed, in which semiconductor memory devices that are in the form of cartridges or cards are used as recording media. Since the recording section of solid-state cameras does not include any chemical processes, movable parts, or an electromagnetic converting system, which are vulnerable to external influences, these cameras are advantageous in that they make it possible for images to be recorded stably and at low cost.

However, a memory cartridge for a conventional solid-state camera can be properly inserted into the camera body only when the memory cartridge is directed in the direction of insertion while assuming one fixed posture. This leads to the following problem. During the replacement of a memory cartridge, the posture of a new cartridge to be inserted must always be checked. This adds a complication to the operation of replacing a cartridge. When a cartridge-replacing operation takes place during photography, in order to check the posture of a new cartridge, the photographer has to temporarily turn away from the subject, often at the risk of losing his shutter release opportunity. If such subjects as animals are being photographed, there is the risk of the photographer losing sight of the subject.

SUMMARY OF THE INVENTION

The present invention therefore aims to provide a solid-state camera which enables a memory cartridge to be replaced easily and quickly.

Another object of the present invention is to attain compatibility of the posture of a memory cartridge during insertion, thereby enabling the operation of replacing a memory cartridge to be performed easily and quickly.

Still another object of the present invention is to attain, with short wires, connection between component contacts of a plurality of connectors provided to enable a memory cartridge to be replaced easily and quickly.

According to one aspect of the present invention, there is provided a solid-state camera having a camera body and employing as a recording medium a solid-state memory cartridge capable of being loaded into and unloaded from the camera body, comprising: first signal transmission means provided on the camera body and a solid-state memory cartridge for permitting the transmission of a signal between the camera body and a solid-state memory cartridge loaded therein while assuming a first loading state; and at least one second signal-transmission means provided on the camera body for permitting the transmission of a signal between the camera body and a solid-state memory cartridge loaded therein while assuming a second loading state different from the first loading state.

By virtue of the provision of the second signal-transmission means, the posture of a solid-state memory cartridge during insertion is rendered compatible, thereby enabling the cartridge to be replaced even when the posture of the cartridge is not visually observed. Thus, a cartridge is not visually observed. Thus, a cartridge-replacing operation can be performed easily and quickly.

According to another aspect of the present invention, there is provided a solid-state camera having a camera body and employing as a recording medium a solid-state memory cartridge capable of being loaded into and unloaded from the camera body, comprising: first signal-transmission means provided on the camera body and a solid-state memory cartridge for permitting the transmission of a signal between the camera body and a solid-state memory cartridge loaded therein while assuming a first loading state; and at least one second signal-transmission means provided on a solid-state memory cartridge for permitting the transmission of a signal between the camera body and a solid-state memory cartridge loaded therein while assuming a second loading state different from the first loading state.

The above-specified provision of the second signal-transmission means also renders the posture of a solid-state memory cartridge during insertion compatible, thereby enabling the cartridge to be replaced even when the posture of the cartridge is not visually observed. Thus, a cartridge-replacing operation can be performed easily and quickly.

According to still another aspect of the present invention, there is provided a solid-state camera having a camera body and employing as a recording medium a memory cartridge capable of being loaded into and unloaded from the camera body, comprising: a signal connector provided on the camera body; and a signal connector provided on the central portion of one side surface of a memory cartridge for transmitting a signal between the camera body and the memory cartridge, wherein a first signal connector formed by one of the signal connectors on the camera body and the memory cartridge has a plurality of contacts divided into groups disposed at positions which are, on a surface of contact with the other or second signal connector, rotationally symmetrical about the normal through that surface of contact, the second signal connector having a plurality of contacts each capable of being connected to one of those contacts of the first signal connector which are within the group disposed at one point symmetrical position.

By virtue of the above-specified arrangement, a plurality of contacts, which are divided into groups and which enable the insertion of a memory cartridge with one posture selected from among a plurality of possible postures, can be disposed very close to each other. Therefore, the wiring distance between contacts which should be connected together to act as equivalent contacts can be rendered short, and the area occupied by the required wires can be small.

According to a further aspect of the present invention, there is provided an information recording system having an information writing and reading apparatus and employing as an information recording medium an unloadable solid-state memory device inserted into an inserting portion of the apparatus, comprising: a signal connector provided on the information writing and reading apparatus; and a signal connector provided on the central portion of one side surface of a solid-state memory device for transmitting a signal between the information writing and reading apparatus and the solid-state memory device, wherein a first signal connector formed by one of the signal connectors on the information writing and reading apparatus and the solid-state memory device has a plurality of contacts divided into groups disposed at positions which are, on a surface of contact with the other or second signal connector, rotationally symmetrical about the normal through that surface of contact, the second signal connector having a plurality of contacts each capable of being connected to one of those contacts of the first connector which are within the group disposed at one point symmetrical position.

By virtue of the above-specified arrangement, a plurality of contacts, which are divided into groups and which enable the insertion of a solid-state memory device with one posture selected from among a plurality of possible postures, can be disposed very close to each other. Therefore, the wiring distance between contacts which should be connected together to act as equivalent contacts can be rendered short, and the area occupied by the required wires can be small.

The above and other objects and features of the invention will appear more fully from a consideration of the following description taken in connection with the accompanying drawings.

DETAILED DESCRIPTION OF THE PREFERRED EMBODIMENTS

The preferred embodiments of the present invention will be described hereunder with reference to the drawings.

Figure 1:
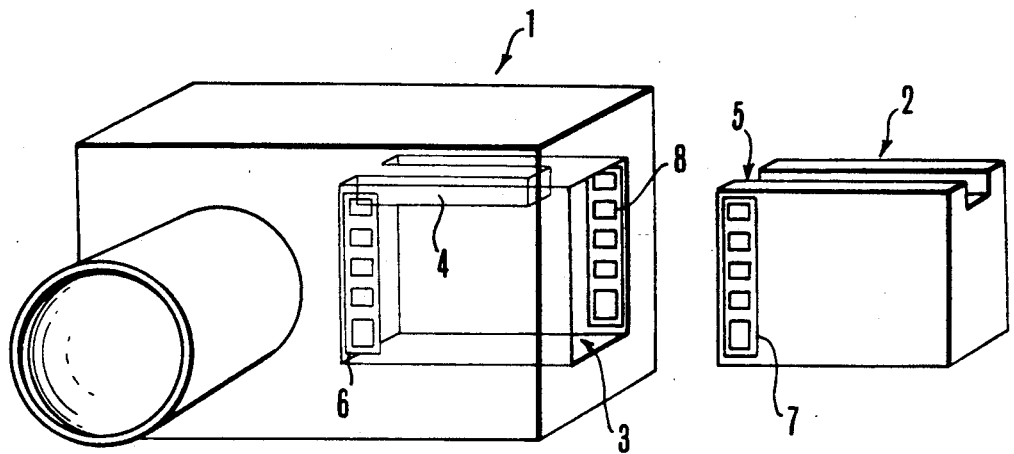
FIG. 1 is a perspective view of a first embodiment of the present invention, partially shown in perspective projection.

FIG. 1 is a perspective view schematically showing the structure of a first embodiment of the present invention. A solid-state camera in accordance with this embodiment includes a camera body 1, a memory cartridge 2 loadable into and unloadable from the camera body 1. The camera body 1 has an opening 3 into which the memory cartridge 2 can be inserted, and a guide bar 4 formed at an upper position of the opening 3, as viewed in the figure. The memory cartridge 2 has a guide groove 5 fit for the guide bar 4. The guide groove 5 extends from the front end face (on the left side, as viewed in the figure) of the memory cartridge 2 to the rear end face thereof, so that, so long as the guide groove 5 extending in the direction of insertion is positioned upward, the memory cartridge 2 can be inserted into the opening 3, with either the front end face or the rear end face leading. A connector 6 is provided on the camera body 1, while a connector 7 having a configuration corresponding to the connector 6 is provided on the memory cartridge 2. Another connector 8 having the same configuration as the first connector 6 is provided on the camera body 1. When the memory cartridge 2 is inserted into the opening 3 while the rear end face of the cartridge 2 is positioned ahead, the second connector 8 of the camera body 1 correctly faces the connector 7 of the memory cartridge 2.

The memory cartridge 2 is similar to a conventional memory cartridge in terms of its function. However, by virtue of the above-described arrangement of the guide groove 5 which permits the memory cartridge 2 to be inserted into the opening 3, with the rear side of the cartridge 2 leading, the posture of the memory cartridge 2 during insertion can be either of two postures. When the memory cartridge 2 with the posture shown in FIG. 1 is inserted, the connector 7 of the cartridge 2 is electrically connected with the connector 6 of the camera body 1. On the other hand, when the memory cartridge 2 is inserted with its rear side leading, the connector 7 is electrically connected with the connector 8. With the embodiment shown in FIG. 1, therefore, when the memory cartridge 2 is to be loaded into the camera body 1, it suffices if a check is made solely as to whether or not the guide groove 5 extends in the direction of insertion and is positioned upward. Since this check can be made by feel, the cartridge 2 can be replaced easily and quickly.

Figure 2:
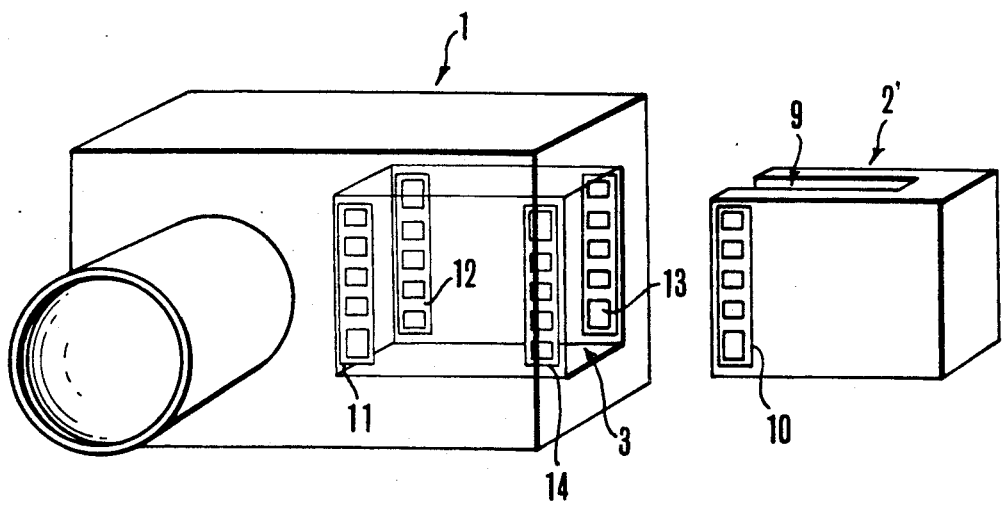
FIG. 2 is a perspective view of a second embodiment of the present invention, partially shown in perspective projection.

FIG. 2 is a perspective view of a solid-state camera in accordance with a second embodiment. In the figure, the same reference numerals as those in FIG. 1 denote the same component parts. A memory cartridge 2' used in this embodiment has a guide groove 9 formed therein to provide compatibility with a camera body which is of the same type as the camera body 1 shown in FIG. 1 (i.e., which has a guide bar 4). The memory cartridge 2' also has a connector 10 provided at the same position as the connector 7 shown in FIG. 1. The camera body 1 has a first connector 11 provided at the same position as the connector 6 shown in FIG. 1, as well as second to fourth connectors 12, 13 and 14 which are each capable of facing and being electrically connected with the connector 10 of the memory cartridge 2' when the cartridge 2' is inserted into an opening 3' of the camera body 1 while the posture of the cartridge 2' is a vertically or horizontally different posture from that shown in FIG. 2. The camera body 1 is not provided with any guide member corresponding to the guide bar 4. Consequently, when the memory cartridge 2' is inserted into the opening 3' of the camera body 1 while the posture of the cartridge 2' is any posture so long as the connector 10 lies in the direction of insertion, the connector 10 of the memory cartridge 2' is connected to one of the connectors 12 to 14 of the camera body 1.

The above-described embodiment gives consideration to the attainment of compatibility with the structure shown in FIG. 1. When the attainment of this compatibility is not required, the position at which connectors of the memory cartridge and the camera body are disposed is not limited to that shown in FIG. 1, but may be varied in order to enable the insertion of the memory cartridge with a posture arbitrarily selected from among a wider range of possibilities. Although in the above-described embodiment the connectors are used to permit the transmission of an electric signal, this is a mere example, and a different system may be adopted where part of or all the connectors serve as media for transmitting an optical signal.

Figure 3:
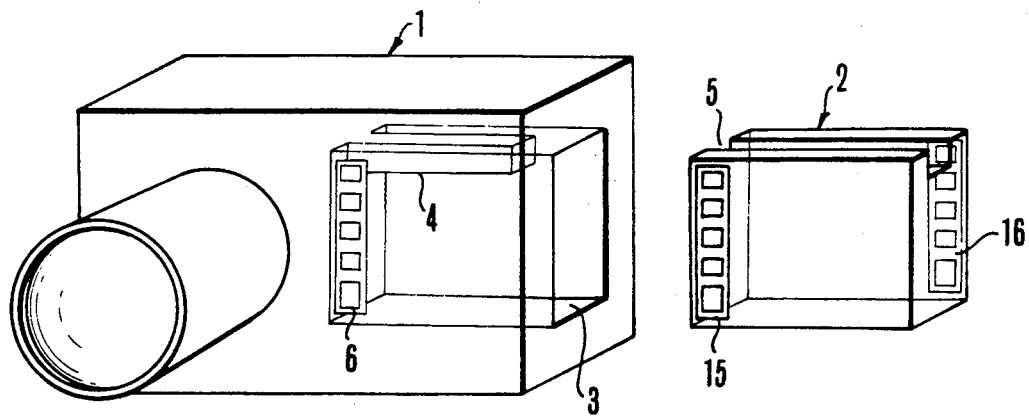
FIG. 3 is a perspective view of a third embodiment of the present invention, partially shown in perspective projection.

Next, a third embodiment of the present invention will be described with reference to FIG. 3. FIG. 3 is a perspective view schematically showing the structure of a solid-state camera in accordance with this embodiment. To be easily understandable, that part of a camera body into which a memory cartridge is inserted and walls of the cartridge are shown in perspective projection. The camera body 1 shown in FIG. 3 has the same structure as the camera body 1 shown in FIG. 1 except that it is not provided with a member corresponding to the connector 8. However, a camera body having the connector 8 may alternatively be used. A camera cartridge 2 has a guide groove 5 fit for a guide bar 4 of the camera body 1. The guide groove 5 extends from the front end face to the rear end face of the memory cartridge 2, so that, so long as the guide groove 5 extending in the direction of insertion is positioned upward, the memory cartridge 2 can be inserted into an opening 3 of the camera body 1 while either the front end face or the rear end face of the cartridge 2 is leading. Two connectors 15 and 16, each being similar to the connector 7 shown in FIG. 1, are provided on the memory cartridge 2. The connectors 15 and 16 are provided on different side surfaces of the memory cartridge 2. The connector 15 which is positioned on the rear side is connected with the connector 6 of the camera body 1 when the memory cartridge 2 is inserted into the opening 3 while the posture of the cartridge 2 is the posture horizontally opposite to that shown in FIG. 3.

Since the above-described arrangement of the groove 5 permits the memory cartridge 2 to be inserted into the opening 3 while the posture of the cartridge 2 is either of two horizontally opposite postures so long as the groove 5 extending in the direction of insertion is positioned upward, this makes it possible to select, from among two different postures, the posture of the memory cartridge 2 during insertion. When, during insertion, the posture of the memory cartridge 2 is that shown in FIG. 3, the connector 15 of the cartridge 2 is electrically connected with the connector 6 of the camera body 1. On the other hand, when the memory cartridge 2 is inserted while its posture is the horizontally opposite posture, the connector 16 is electrically connected with the connector 6. With the embodiment shown in FIG. 3, therefore, when the memory cartridge 2 to be loaded into the camera body 1, it suffices if a check is made simply as to whether or not the guide groove 5 extends in the direction of insertion and is positioned upward. Since this check can be made by feel, the cartridge 2 can be replaced easily and quickly.

Figure 4:
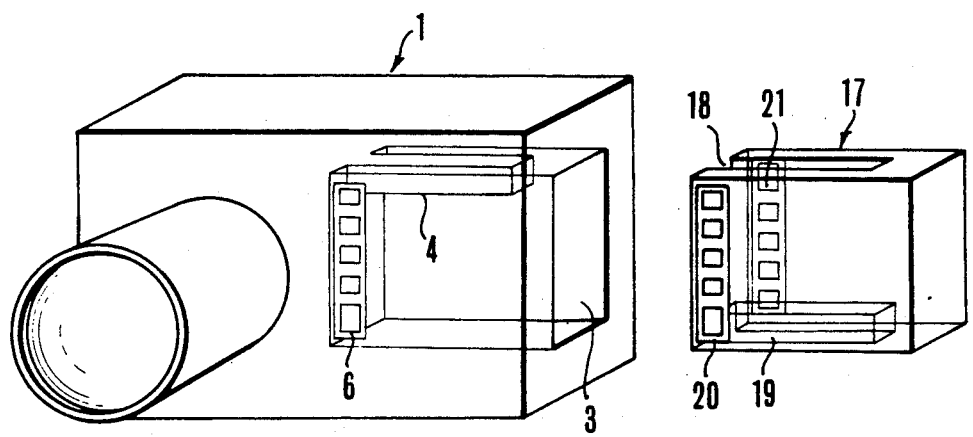
FIG. 4 is a perspective view of a fourth embodiment of the present invention, partially shown in perspective projection.

FIG. 4 shows the structure of a fourth embodiment which is a modification of the embodiment shown in FIG. 3. In this embodiment, the camera body 1 used is the same as that of the previous embodiment. To be easily understandable, FIG. 4 also shows certain portions of the camera body 1 and walls of a memory cartridge 17 in perspective projection. The upper and lower surfaces of the memory cartridge 17 are formed with guide grooves 18 and 19, respectively, which each have a limited length that is shorter than the full length of the cartridge 17 and is fit for the guide bar 4 of the camera body 1. Two connectors 20 and 21 are provided on the front portions of either side surface of the cartridge 17. Since the guide grooves 18 and 19 each have a limited length, the memory cartridge 17 cannot be inserted into the opening 3 of the camera body 1 when that end portion of the cartridge 17 having the closed ends of the grooves 18 and 19 faces the opening 3. However, with the horizontally opposite end portion of the cartridge 17 facing, it can be inserted into the opening 3 while its posture is either of two vertically opposite postures because the guide grooves 18 and 19 are provided on the upper and lower surfaces.

When the memory cartridge 17 is inserted into the opening 3 of the camera body 1 while the posture of the cartridge 17 is that shown in FIG. 4, the connector 20 of the cartridge 17 is connected to the connector 6 of the camera body 1. On the other hand, when the cartridge 17 is inserted into the opening 3 while it is positioned upside down, the guide bar 4 engages with the guide groove 19, and the connector 21 of the cartridge 17 is connected with the connector 6. Thus, in this embodiment, the connector 21 has its contacts arranged in an order which is the opposite of the order in which the contacts of the connector 20 are arranged.

With the embodiment shown in FIG. 4, when the memory cartridge 17 is to be loaded into the camera body 1, it suffices if the front side and the rear side of the cartridge 17 are distinguished from each other by feeling the configuration of the guide groove 18 and/or the guide groove 19. In this way, the cartridge 17 can be replaced without the need for visual observation.

Figure 5:
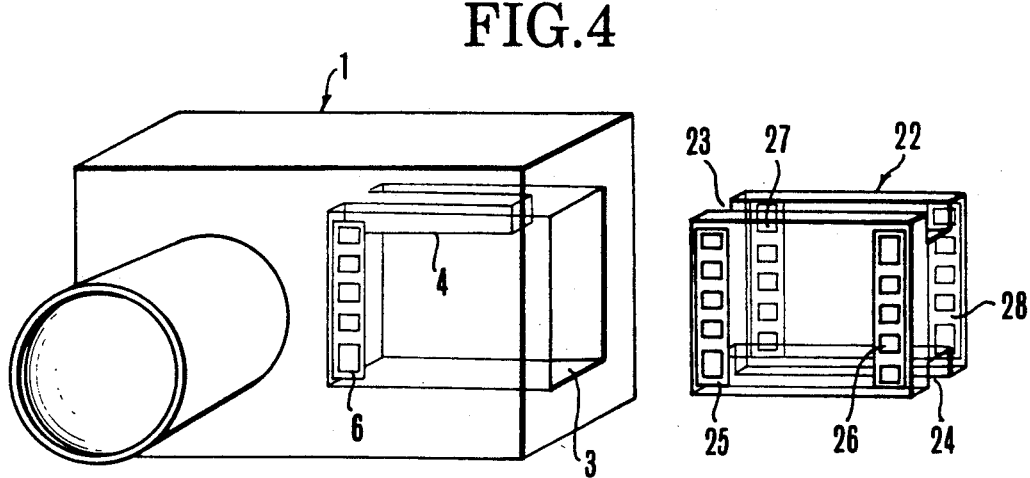
FIG. 5 is a perspective view of a fifth embodiment of the present invention, partially shown in perspective projection.

FIG. 5 shows a fifth embodiment of the present invention. In this embodiment, the upper and lower surfaces of a memory cartridge 22 are formed with guide grooves 23 and 24, respectively, each of which fits for the guide bar 4 of the camera body 1, and each of which extends from the front end face to the rear end face of the cartridge 22. Accordingly, the cartridge 22 can be inserted into the opening 3 of the camera body 1, with either of two horizontally opposite sides of the cartridge 22 leading, and with either of two vertically opposite sides thereof positioned upward, so long as a connector of the memory cartridge 22 lies in the direction of insertion. In order to establish connection for signal transmission between the cartridge 22 and the camera body 1, connectors 25 and 26, which are positioned on horizontally opposite sides, are provided on one side surface of the cartridge 22, while connectors 27 and 28, which are also positioned on horizontally opposite sides, are provided on the other side surface.

With the embodiment shown in FIG. 5, therefore, the cartridge 22 can be inserted while its posture is a posture arbitrarily selected from among a further wider range of possibilities, in order to establish connection for signal transmission between the memory cartridge 22 and the camera body 1, thereby further facilitating and quickening a cartridge-replacing operation.

Figure 6:
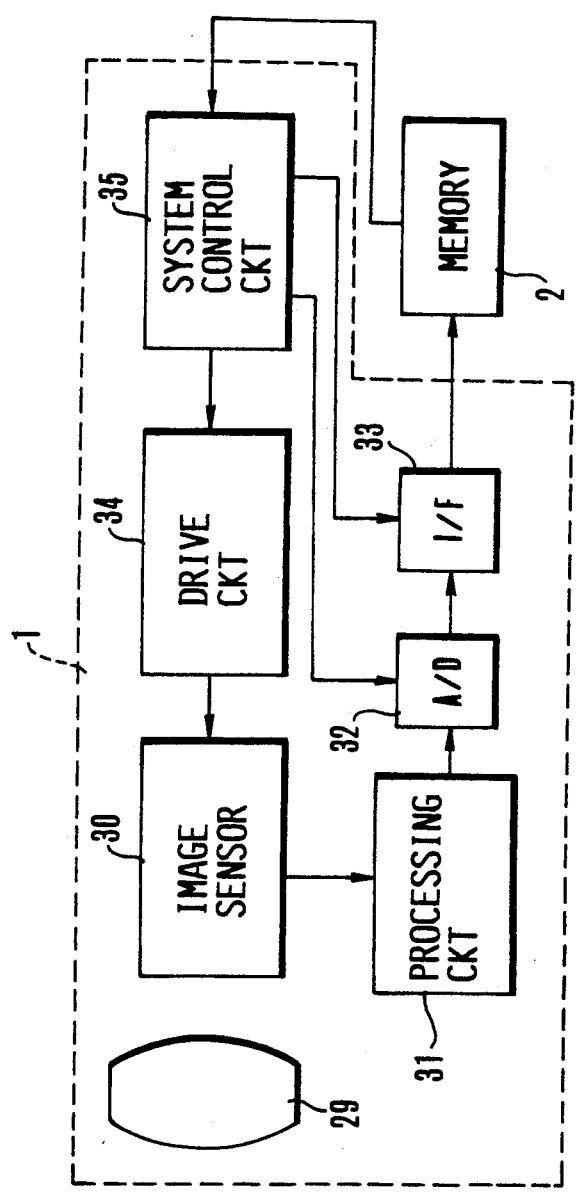
FIG. 6 is a diagram showing the electric circuit of a solid-state camera in accordance with the present invention.

FIG. 6 is a diagram showing the system arrangement of a solid-state camera of the present invention. The solid-state camera comprises a camera body 1, and a memory cartridge 2 for recording images resulting from photography, which is unloadable from the camera body 1. The camera body 1 has a photographic lens 29, a solid-state image sensor 30, a processing circuit 31, an A/D converter 32, an interface circuit 33 for interfacing the memory cartridge 2 with the camera body 1, a drive circuit 34 for driving the image sensor 30, and a system control circuit 35 for controlling the entire system.

The operation of the system shown in FIG. 6 will be briefly described. An image of a subject which is formed by the photographic lens 29 is converted into an electric signal by the image sensor 30. The output of the image sensor 30 is subjected to a known image-signal-processing operation by the processing circuit 31, then converted into a digital signal by the A/D converter 32. The interface circuit 33 converts the resultant digital data into a form suitable for recording in the memory cartridge 2. A signal output from the interface circuit 33 is transmitted to the memory cartridge 2 via mutually connected connectors of the camera body 1 and the memory cartridge 2, so as to be recorded. The system control circuit 35 controls the above-described actions.

Figure 7:
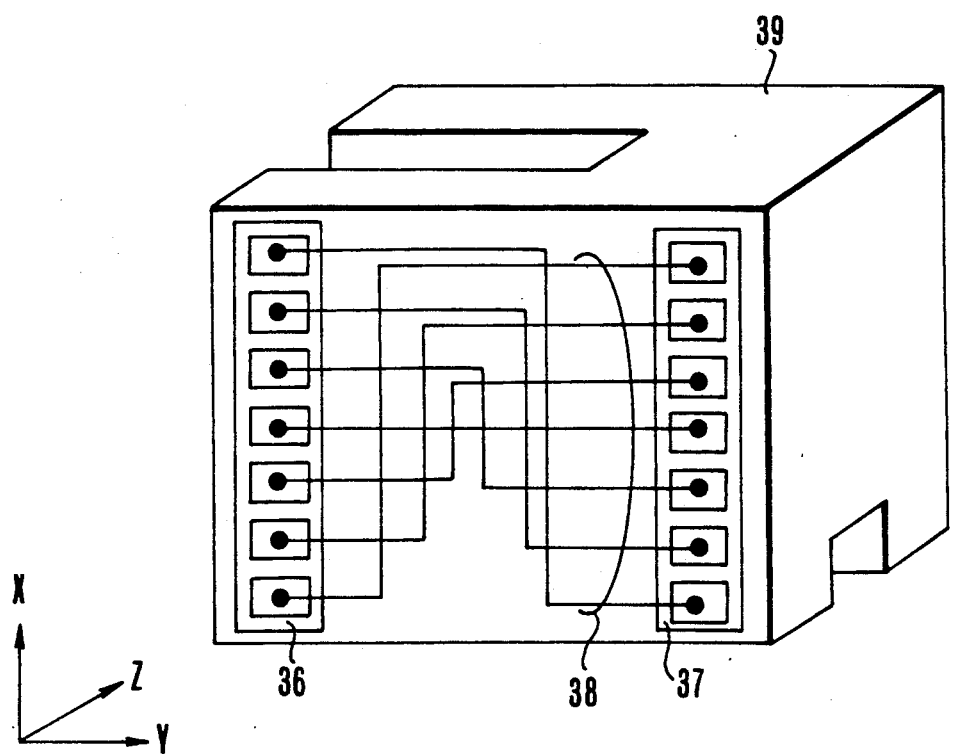
FIG. 7 is a fragmentary perspective view of a sixth embodiment of the present invention.

FIG. 7 is an external perspective view of a memory cartridge 39 used in a sixth embodiment of the present invention. The memory cartridge 39 has a first connector 36 and a second connector 37. These connectors 36 and 37 are provided on the same side surface of the memory cartridge 39. When XYZ coordinates are determined, as shown in FIG. 7, a plurality of contacts constituting the connector 36 and a plurality of contacts constituting the connector 37 are disposed in rotational symmetry about a center line extending in the direction of the Z coordinate axis, and each pair of contacts in mutual rotationally-symmetrical relationship are electrically connected to each other within the memory cartridge 39. By virtue of the above-described arrangement, even when the memory cartridge 39 is rotated through 180° about the Z coordinate axis, one of the connectors 36 and 37 is naturally able to be connected with the corresponding connector (i.e., the connector 6 shown in FIG. 1) of the camera body 1, thereby enabling signal transmission.

A seventh embodiment of the present invention will now be described. In the descriptions given below, a connector unit has five contacts, by way of example, which are provided for the purpose of transmitting a signal (and supply of power).

Figure 8:
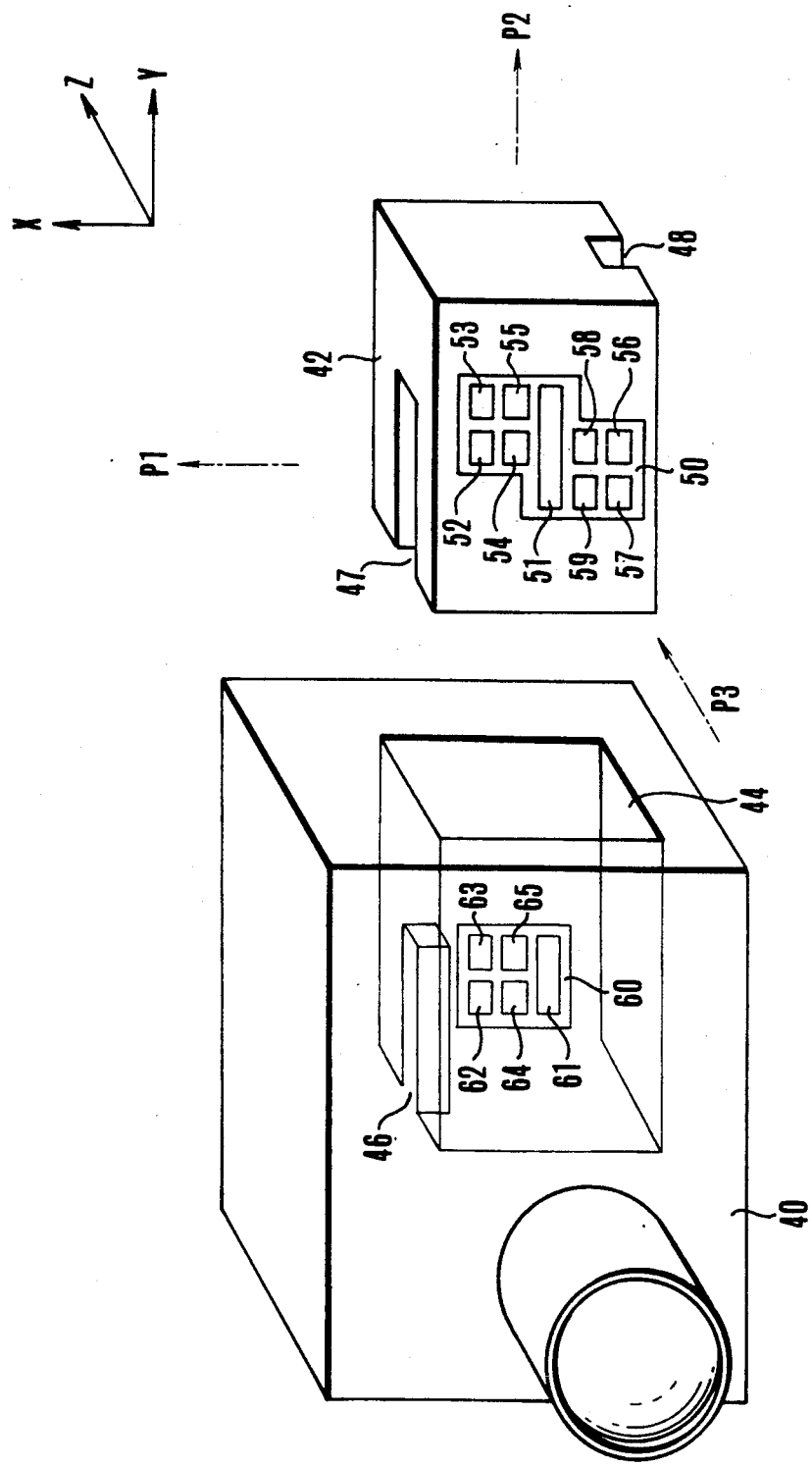
FIG. 8 is a perspective view of a seventh embodiment of the present invention, partially shown in perspective projection.

FIG. 8 is a perspective view of a seventh embodiment of the present invention. The entire system comprises a camera body 40 and a memory cartridge 42. One side surface of the camera body 40 is formed with a recess capable of receiving substantially the entire structure of the memory cartridge 42, hence, with a cartridge receiving portion 44. Inside the receiving portion 44, a guide bar 46 projects to regulate the direction in which the memory cartridge 42 is inserted into the receiving portion 44 in such a manner that the cartridge 42 can be inserted into the receiving portion 44 only in one predetermined direction. The upper and lower surfaces of the memory cartridge 42 are formed with guide grooves 47 and 48, respectively, each of which has dimensions fit for the guide bar 46. The structure and position of these guide grooves 47 and 48 are defined such that they are rotationally symmetrical about the center line P3 extending in the Z-axis direction of the memory cartridge 42. With this embodiment, the memory cartridge 42 can be inserted into the receiving portion 44 while the cartridge 42 is in either of two states, that is, either in the state of the cartridge 42 shown in the figure or in its state of being rotated through 180° about the center line P3 (i.e., in its vertically and horizontally opposite state).

Figure 9:
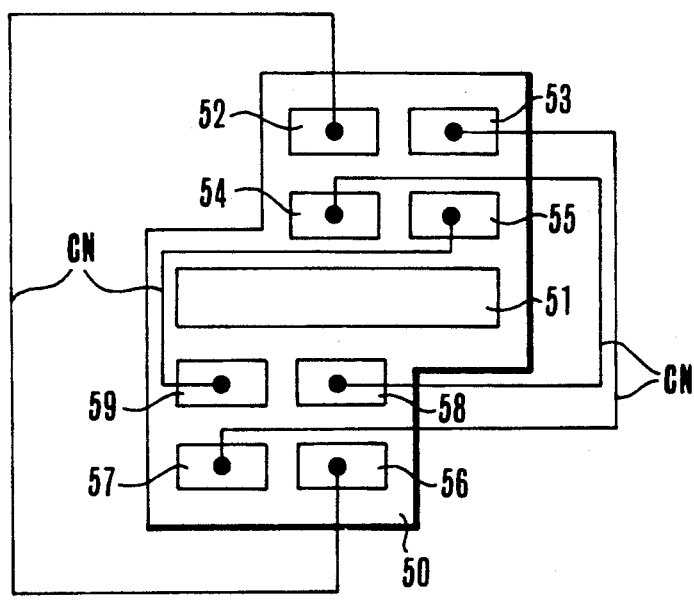
FIG. 9 is an illustration of the wiring between contacts of a connector 50, shown in FIG. 8.

A connector 50 is provided on one side surface of the memory cartridge 42 so as to enable the transmission of a signal between the camera body 40 (and to supply power). The connector 50 has nine contacts 51, 52, 53, 54, 55, 56, 57, 58 and 59. The contact 51 is disposed at a position on the center line P3, while each of the pairs of other contacts, that is, the pair comprising the contacts 52 and 56, the pair comprising the contacts 53 and 57, the pair comprising the contacts 54 and 58, and the pair comprising the contacts 55 and 59 are each disposed at positions which are rotationally symmetrical about the center line P3. As shown in FIG. 9, each pair of contacts is electrically connected together via internal wiring formed by each of, e.g., signal lines CN. When the memory cartridge 42 is in its state of being loaded in the camera main body 40, either of two groups of contacts, that is, a first group comprising the contacts 51, 52, 53, 54 and 55, or a second group comprising the contacts 51, 56, 57, 58 and 59, is connected to transmit a signal between the camera body 40, the group of the contacts used being determined in accordance with the posture of the memory cartridge 42 with which it is loaded.

A connector 60 is provided on one inner side surface of the receiving portion 44 of the camera body 40. The connector 60 has five contacts 61, 62, 63, 64 and 65 which are capable of respectively facing the first group of contacts 51, 52, 53, 54 and 55 of the connector 50 of the memory cartridge 42 when the memory cartridge 42 with the posture shown in FIG. 8 is loaded. When the memory cartridge 42 is inserted into the receiving portion 44 as it is in the state of being rotated from the state shown in the figure through 180 degrees about the center line P3, the contacts 61 to 65 of the connector 60 naturally face the corresponding ones of the second group of contacts 51, 56, 57, 58 and 59 of the connector 50. Since the contact 51 has to be connected to the contact 61 whichever the posture of the memory cartridge 42 may be, the contact 51 is so formed as to be considerably larger than the corresponding contact 61.

Figure 10:
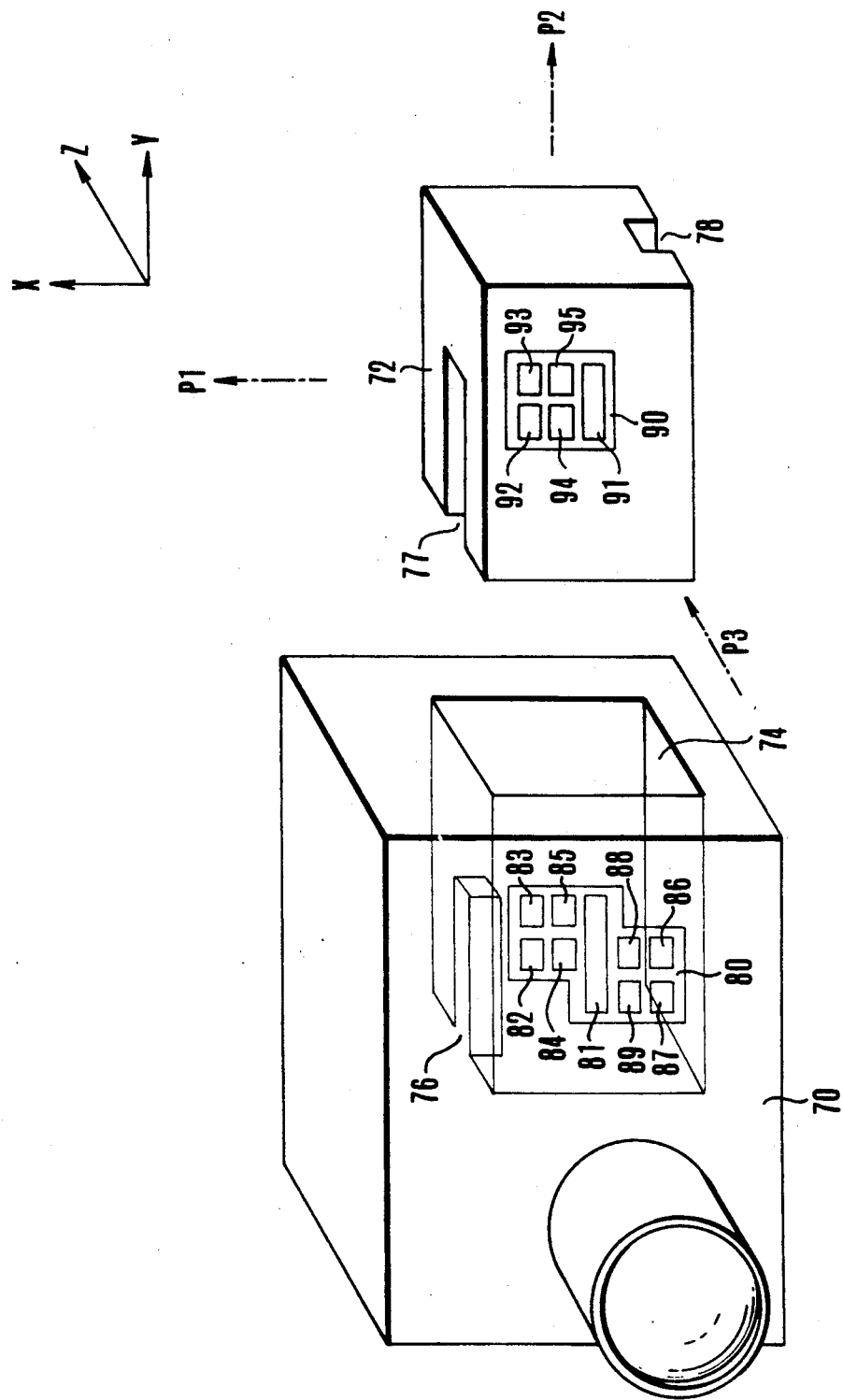
FIG. 10 is a perspective view of an eighth embodiment of the present invention, partially shown in perspective projection.
Figure 11:
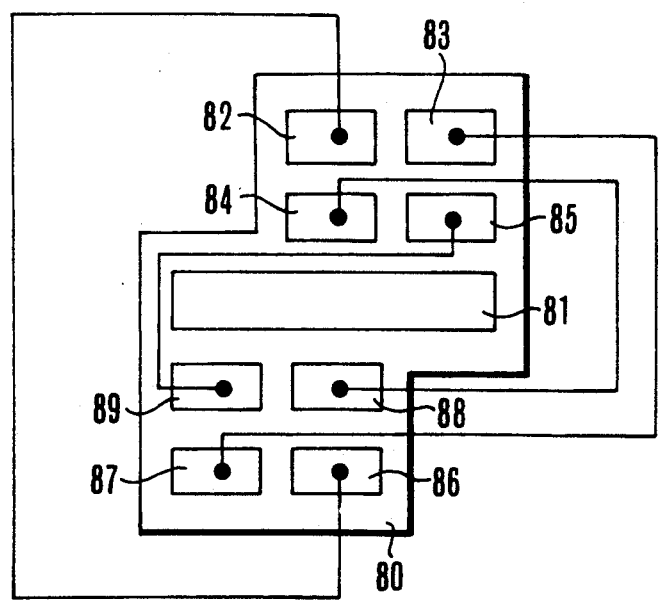
FIG. 11 is an illustration of the wiring between contacts of a connector 80, shown in FIG. 10.

FIG. 10 is a perspective view of an eighth embodiment. In this embodiment, the configuration of a receiving portion 74 of a camera body 70, and that of guide grooves 77 and 78 of a memory cartridge 72 are exactly the same as those of the corresponding component parts shown in FIG. 8. However, this embodiment is distinguished in that a connector 80 having exactly the same configuration as that of the connector 50 shown in FIG. 8 is provided on an inner surface of the camera body 70, while a connector 90 having exactly the same configuration as that of the connector 60 shown in FIG. 8 is provided on one side surface of the memory cartridge 72. The connector 80 of the camera body 70 has contacts 81 to 89, and electrical connection is established within the connector 80 between the contacts 82 and 86, between the contacts 83 and 87, between the contacts 84 and 88, and between the contacts 85 and 89, in the manner shown in FIG. 11.

With the embodiment shown in FIG. 10, electrical connection between the camera body 70 and the memory cartridge 72 is established in a manner similar to that in the previous embodiment. Specifically, when the memory cartridge 72 with the posture shown in the figure is inserted, the contacts 91, 92, 93, 94 and 95 of the connector 90 of the cartridge 72 are respectively connected to the contacts 81, 82, 83, 84 and 85 of the connector 80 of the camera body 70. The memory cartridge 72 can also be inserted into the receiving portion 74 when assuming a posture in which the cartridge 72 is rotated through 180° about the center line P3 extending in the Z-axis direction of the cartridge 72. In this case, the contacts 91, 92, 93, 94 and 95 of the connector 90 of the memory cartridge 72 respectively face and are connected to the contacts 81, 86, 87, 88 and 89 of the connector 80 of the camera body 70.

Figure 12:
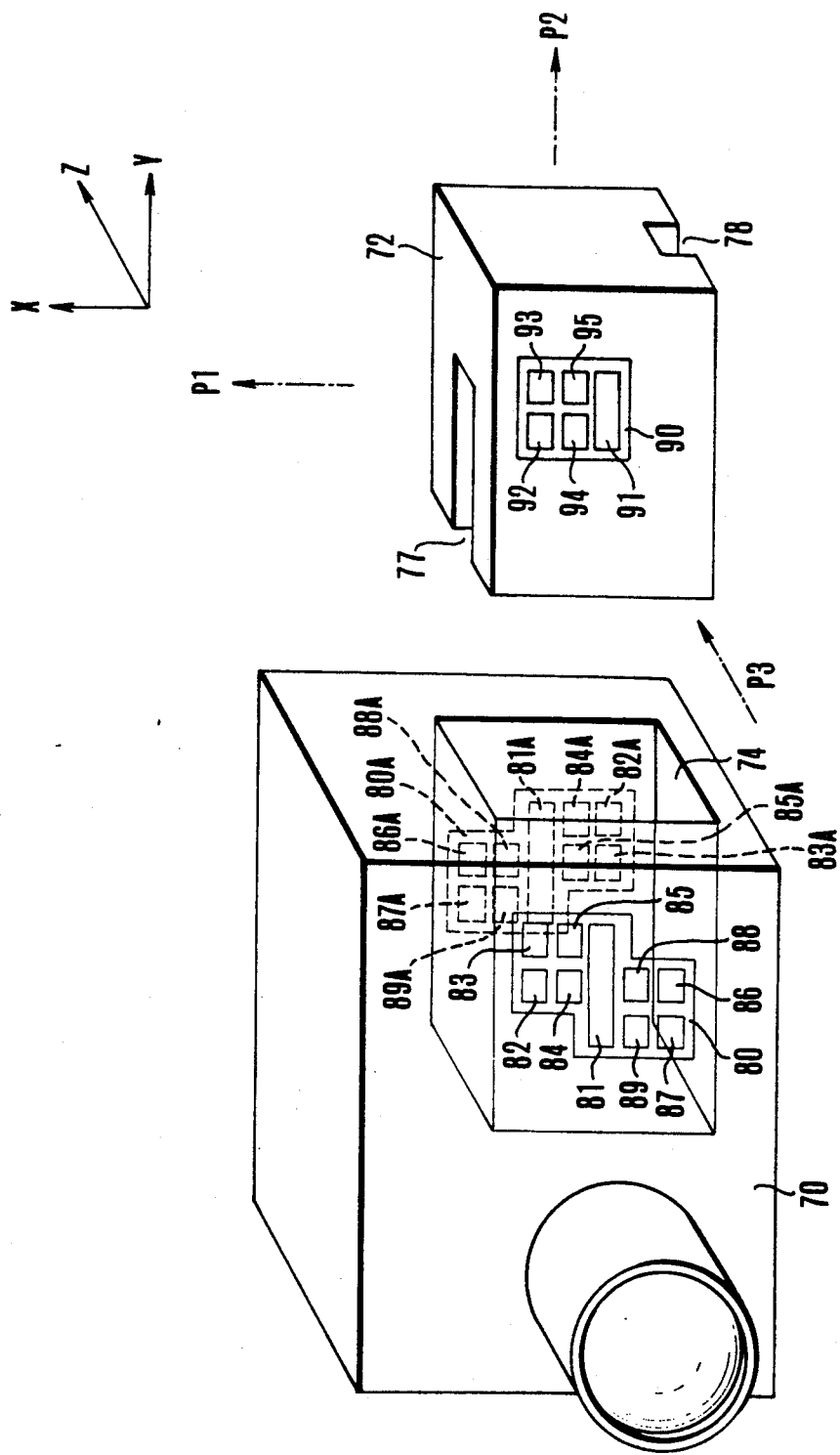
FIG. 12 is a perspective view of a ninth embodiment of the present invention.
Figure 13:
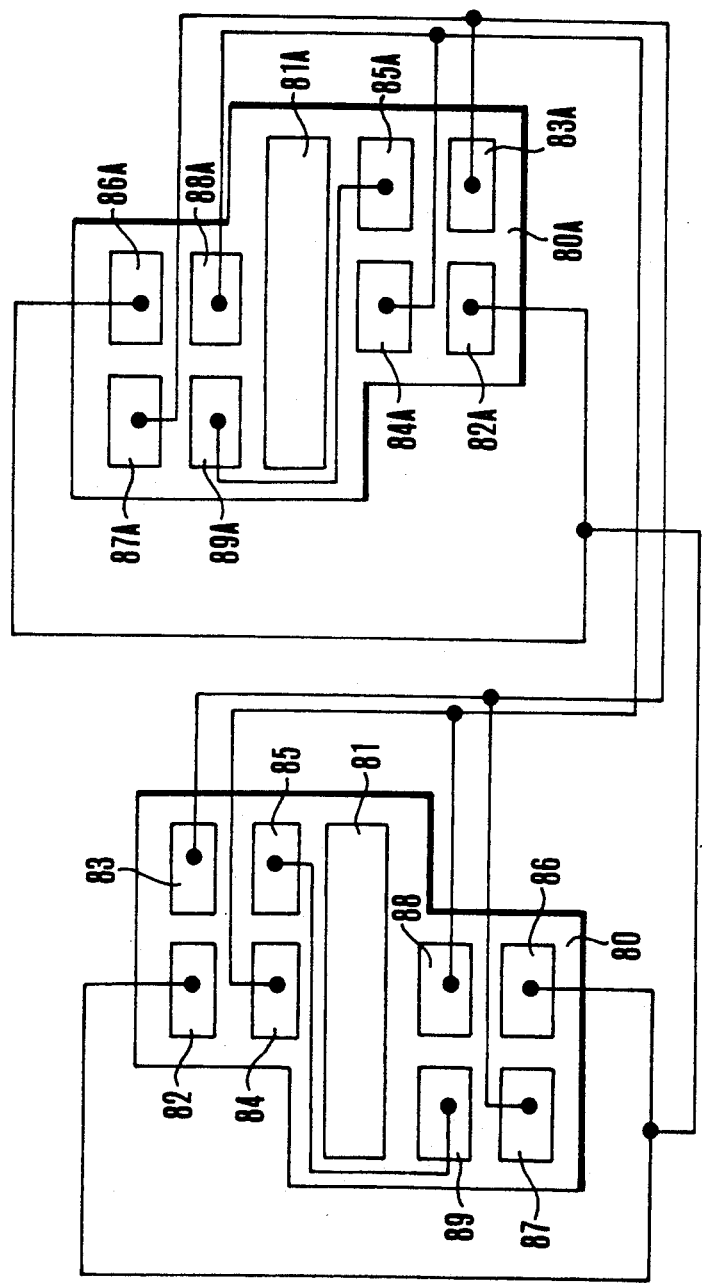
FIG. 13 is an illustration of the wiring between contacts of connectors 80 and 80A, shown in FIG. 12.

FIG. 12 is a perspective view of a ninth embodiment of the present invention which is a modification of the embodiment shown in FIG. 10. Specifically, the ninth embodiment is distinguished in that the guide bar 76 in the receiving portion 74 is omitted, and a connector 80A, which is similar to the connector 80, is provided on the inner surface opposing the inner surface where the connector 80 is provided. The connector 80A is, however, in a certain positional relationship with the connector 80 in which the connector 80 is rotationally symmetrical about a line extending in the X-axis direction. As shown in FIG. 13, in the connectors 80 and 80A, mutual connection is established within the camera body 70 between the contacts 81 and 81A, in a group comprising the contacts 82, 86, 82A and 86A, in a group comprising the contacts 83, 87, 83A and 87A, in a group comprising the contacts 84, 88, 84A and 88A, and in a group comprising the contacts 85, 89, 85A and 89A, in the manner shown in FIG. 13.

By virtue of this arrangement, even when the memory cartridge 72 assumes a posture in which it is rotated through 180 degrees about the center line P1 extending in the X-axis direction, or when it assumes a posture in which it is rotated through 180 degrees about the center line P2 extending in the Y-axis direction, the insertion of the memory cartridge 72 into the receiving portion 74 enables the necessary connection to be established via connectors. In other words, the memory cartridge 72 can be loaded into the camera body 70 while the posture of the cartridge 72 is one of four postures, and, upon the completion of the loading, the connector 90 of the cartridge 72 faces and is connected to the connector 80 or 80A of the camera body 70.

With the arrangement shown in FIG. 12, the guide grooves 77 and 78 of the cartridge 72 may be omitted. With this embodiment, it is possible to establish connection by inserting the memory cartridge 72 while its posture is any of the four postures. Therefore, even when the operator checks the state of the cartridge 72 only by the feel and without observing it, a memory cartridge replacement operation can be performed quickly and easily.

In each of the embodiments shown in FIGS. 8, 10 and 12, in order to achieve the above-described advantages, it suffices if mutual connection is established between contacts located relatively close to each other. Furthermore, each of the contacts 51, 81 and 81A that is located in the center is used commonly with respect to a plurality of connector units. Therefore, the entire wiring distance can be short, and the area required for the wiring can be small.

Figure 14:
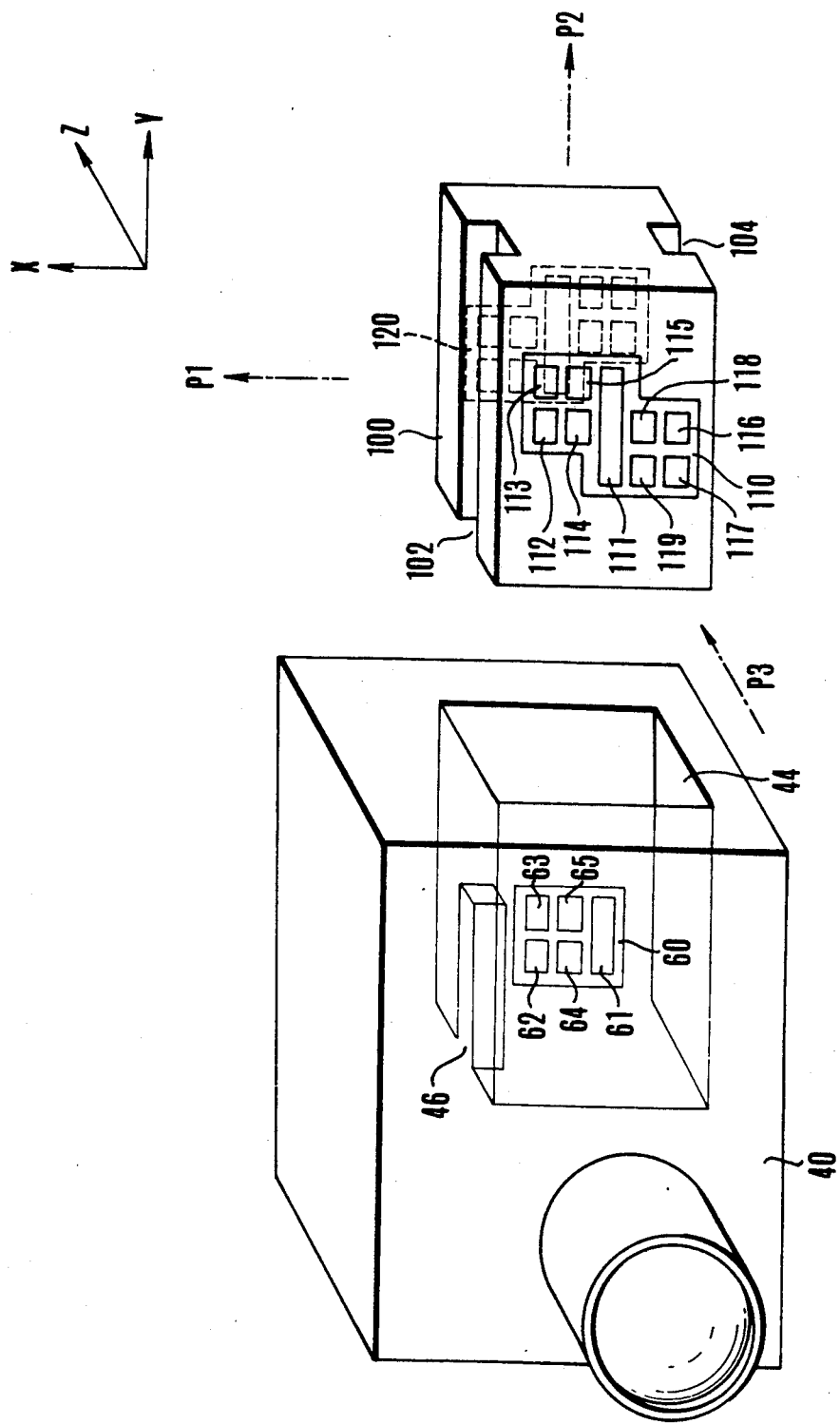
FIG. 14 is a perspective view of a tenth embodiment of the present invention, partially shown in perspective projection.

FIG. 14 is a perspective view of a tenth embodiment which is a modification of the embodiment shown in FIG. 8. The structure of the camera body is the same as that shown in FIG. 8. In contrast with the embodiment shown in FIG. 8 where the memory cartridge 42 has its connector provided only on one side surface thereof, in this embodiment, connectors 110 and 120 are provided on either side surface of a memory cartridge 100 so that the cartridge 100 can be loaded into the camera body 40 while the posture of the cartridge 100 is any of four postures. The memory cartridge 100 is also provided with an upper surface guide groove 102 and a lower surface guide groove 104, each of which extends over the full length of the upper surface or the lower surface of the memory cartridge 100.

Figure 15:
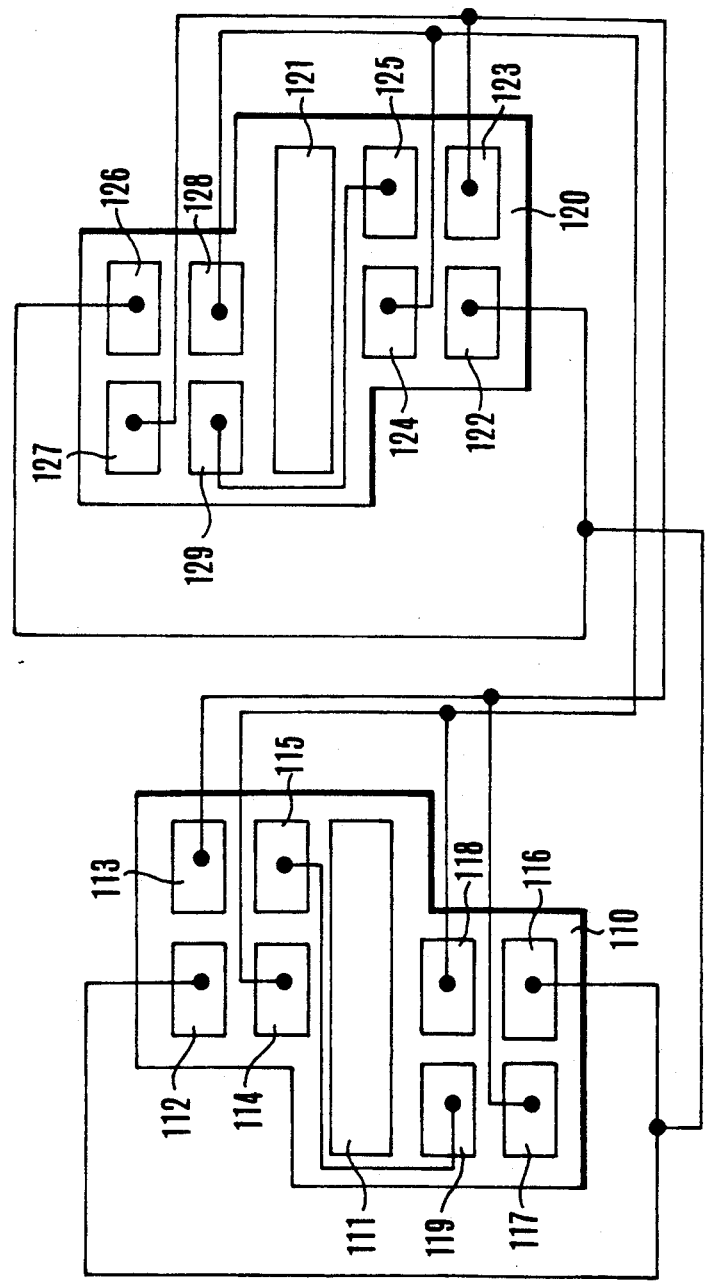
FIG. 15 is an illustration of the wiring between contacts of connectors 110 and 120, shown in FIG. 14.

Contacts 111 to 119 constituting the connector 110 and contacts 121 to 129 constituting the connector 120 are disposed at rotationally symmetrical positions about the center line P1 extending in the X-axis direction. As shown in FIG. 15, mutual connection via internal wiring is established between the contacts 111 and 121, between contacts 112 and 122, between contacts 113 and 123, between the contacts 114 and 124, between the contacts 115 and 125, between the contacts 116 and 126, between the contacts 117 and 127, between the contacts 118 and 128, and between the contacts 119 and 129. Mutual connection via internal wiring is also established between the contacts 112 and 116, between the contacts 113 and 117, between the contacts 114 and 118, and between the contacts 115 and 119.

Since the connectors 110 and 120 can be disposed close to each other, the entire length of signal lines required to establish the above-described connection can be short, and, in addition, the area required for the wiring can be small.

We claim:

1. A solid-state camera having a camera body for supporting a recording medium and employing as the recording medium a solid-state memory cartridge for recording signals, said solid-state memory cartridge being capable of being loaded into and unloaded from the camera body, first signal-transmission means provided on the camera body and the solid-state memory cartridge for permitting the transmission of a signal between the camera body and the solid-state memory cartridge loaded therein while assuming a first loading state, and at least one second signal-transmission means provided on the camera body for permitting the transmission of a signal between the camera body and the solid-state memory cartridge by connecting said second signal-transmission means of said camera body and said first signal-transmission means of said solid-state memory cartridge when said solid-state memory cartridge and said camera body are connected in a second loading state different from said first loading state.

2. A solid-state camera according to claim 1, wherein each of said first and second signal-transmission means includes electrical contacts.

3. A solid-state camera having a camera body for supporting a recording medium and employing as the recording medium a solid-state memory cartridge for recording signals, said solid-state memory cartridge being capable of being loaded into and unloaded from the camera body, first signal-transmission means provided on the camera body and the solid-state memory cartridge for permitting the transmission of a signal between the camera body and the solid-state memory cartridge loaded therein while assuming a first loading state, and second signal-transmission means provided on the solid-state memory cartridge for permitting the transmission of a signal between the camera body and the solid-state memory cartridge by connecting said second signal-transmission means of the solid-state memory cartridge and said first signal-transmission means of the camera body when the solid-state memory cartridge and the camera body are connected in a second loading state different from the first loading state.

4. A solid-state camera according to claim 3, wherein each of said first and second signal-transmission means includes electrical contacts.

5. A solid-state camera having a camera body for supporting a recording medium and employing as the recording medium a memory cartridge for recording signals, said solid-state memory cartridge being capable of being loaded into and unloaded from the camera body, a signal connector provided on the camera body, and a signal connector provided on the central portion of one side surface of the memory cartridge for transmitting a signal between the camera body and the memory cartridge, wherein a first signal connector formed by one of said signal connectors on the camera body and the memory cartridge has a plurality of contacts divided into groups disposed at positions which are, on a surface of contact with the other or second signal connector, rotationally symmetrical about the normal through said surface of contact, the second signal connector having a plurality of contacts each capable of being connected to one of those contacts of the first signal connector which are within the group disposed at one point symmetrical position.

6. A solid-state camera according to claim 5, wherein said signal connector of the memory cartridge is disposed on two opposing side surfaces of the memory cartridge.

7. A solid-state camera according to claim 5, wherein said signal connector of the camera body is disposed on two inner surfaces of the camera body which are capable of coming into contact with two opposing side surfaces of the memory cartridge.

8. An information recording system having an information writing and reading apparatus and employing as an information recording medium an unloadable solid-state memory device inserted into an inserting portion of the apparatus, said writing and reading apparatus being adapted for writing signals on and reading signals from said solid-state memory device, said solid-state memory device being adapted to store signals, a signal connector provided on the information writing and reading apparatus; and a signal connector provided on the central portion of one side surface of the solid-state memory device for transmitting a signal between the information writing and reading apparatus and the solid-state memory device, wherein a first signal connector formed by one of said signal connectors on the information writing and reading apparatus and the solid-state memory device has a plurality of contacts divided into groups disposed at positions which are, on a surface of contact with the other or second signal connector, rotationally symmetrical about the normal through said surface of contact, the second signal connector having a plurality of contacts each capable of being connected to one of those contacts of the first connector which are within the group disposed at one point symmetrical position.

9. An information recording system according to claim 8, wherein said signal connector of the solid-state memory device is disposed on two opposing side surfaces of the memory device.

10. An information recording system according to claim 8, wherein said signal connector of the information writing and reading apparatus is disposed on two inner surfaces of the apparatus which are capable of coming into contact with two opposing side surfaces of the solid-state memory device.

11. An electronic instrument system, comprising:
a) a first electronic instrument including a memory for storing signals and, at least first and second connecting means for the transmission of signals; and
b) a second electronic instrument including a mounting part mounted on said first electronic instrument and a third connecting means for the transmission of signals; wherein at least two kinds of mounting state are included as the mounting state of said first electronic instrument on said second electronic instrument, and said first or second connecting means is selectively connected with the third connecting means, depending upon the mounting state.

12. An electronic instrument system according to claim 11, wherein said memory includes a semiconductor memory.

13. An electronic instrument system according to claim 11, wherein said second electronic instrument includes a camera.

14. An electronic instrument system according to claim 11, wherein each of said connecting means includes a plurality of electric contacts.

15. An electronic instrument system, comprising:
a. a first electronic instrument including a memory for storing signals and first connecting means for the transmission of signals; and
b. a second electronic instrument including a single mounting part mounted on said first electronic instrument and second and third connecting means for the transmission of signals selectively connectable with said first connecting means;
wherein at least two kinds of mounting state are included as the mounting state of said first electronic instrument on said second electronic instrument, and said second or third connecting means is selectively connected with said first connecting means.

16. An electronic instrument system according to claim 15, wherein said memory includes a semiconductor memory.

17. An electronic instrument system according to claim 15, wherein said second electronic instrument includes a camera.

18. An electronic instrument system according to claim 15, wherein each of said connecting means includes a plurality of electric contacts.

19. An electronic instrument system according to claim 11, wherein said first electronic instrument includes a memory cartridge.

20. An electronic instrument system according to claim 15, wherein said first electronic instrument includes a memory cartridge.

* * * * *

UNITED STATES PATENT AND TRADEMARK OFFICE
CERTIFICATE OF CORRECTION

PATENT NO. : 5,206,731

DATED : April 27, 1993

INVENTOR(S) : Kan Takaiwa, et al

It is certified that error appears in the above-indentified patent and that said Letters Patent is hereby corrected as shown below:

On the title page, Item [54] and in Column 1, line 1, in the title "SOLID STATE" should read --SOLID-STATE-- .

UNITED STATES PATENT AND TRADEMARK OFFICE
CERTIFICATE OF CORRECTION

PATENT NO. : 5,206,731

DATED : April 27, 1993

INVENTOR(S) : Kan Takaiwa, et al.

It is certified that error appears in the above-identified patent and that said Letters Patent is hereby corrected as shown below:

Col. 10, line 45. After "small." insert -- As will be seen from the foregoing, the invention will be seen to provide an electronic instrument system, having a first electronic instrument, constituted, e.g., by a memory for storing signals and having at least first and second connectors for the transmission of signals, and a second electronic instrument, constituted, e.g., as a camera including a mounting part mounted on the first electronic instrument and a third connector for the transmission of signals, wherein at least two kinds of mounting state are included as the mounting state of the first electronic instrument on the second electronic instrument, and the first or second connector is selectively connected with the third connector, depending upon the mounting state. --

Signed and Sealed this

Eighth Day of February, 1994

Attest:

BRUCE LEHMAN

Attesting Officer

Commissioner of Patents and Trademarks